United States Patent
Baker

[15] 3,663,295
[45] May 16, 1972

[54] STORAGE BATTERY ELECTROLYTE
[72] Inventor: Bernard S. Baker, Chicago, Ill.
[73] Assignee: Institute of Gas Technology
[22] Filed: May 14, 1969
[21] Appl. No.: 824,707

[52] U.S. Cl. ................................................136/6, 136/153
[51] Int. Cl. .......................................................H01m 9/00
[58] Field of Search ...........................136/6, 86, 153, 146, 83

[56] References Cited

UNITED STATES PATENTS

| | | | |
|---|---|---|---|
| 3,257,239 | 6/1966 | Shultz et al. | 136/86 |
| 3,488,221 | 1/1970 | Shimotake et al. | 136/6 X |
| 2,276,188 | 10/1939 | Greger | 136/153 |
| 3,419,436 | 12/1968 | Recht et al. | 136/153 |
| 3,510,359 | 5/1970 | Selover et al. | 136/153 |

FOREIGN PATENTS OR APPLICATIONS 1,502,386  11/1967  France..................................136/153

Primary Examiner—Donald L. Walton
Attorney—Bair, Freeman & Molinare

[57] ABSTRACT

An improved electrolyte phase for use in high temperature primary and secondary batteries of the thermally or electrically regenerative type. The improved electrolyte phase is made up of a support matrix, which is solid or paste-like at the operating conditions for the battery, and the electrolyte for the battery immobilized and incorporated in the support matrix. The support matrix is made up of an inert alkali metal salt such as alkali metal aluminate. The electrolyte may be an alkali metal halide or mixtures of alkali metal halides.

9 Claims, No Drawings

STORAGE BATTERY ELECTROLYTE

BACKGROUND OF THE INVENTION

This invention relates to high temperature primary and secondary batteries of either the thermally or electrically regenerative type. More particularly, this invention is directed to a battery electrolyte for use in such batteries.

There exists a class of high temperature electro-chemical and pseudo-electrochemical systems which are used in either electrically or thermally regenerable batteries. When the term "high temperature" is used herein, it is meant a temperature above the highest of the melting points of the electrolyte and the reactive portions of the electrodes. The high temperatures at which such batteries operate are typically 250°–300° C. or higher. A typical example of such a pure electrochemical cell (hereinafter referred to as Type I) is a lithium-chlorine battery. In such a battery, the anode is metallic lithium, which is in liquid form at the operating conditions of the battery, and the cathode is a porous carbon electrode with fluid (gaseous) chlorine as the oxidant in association therewith. In such a battery, the anode reaction is:

$$Li \rightarrow Li^+ + e^- \qquad (1)$$

and the corresponding cathode reaction is:

$$e^- + 1/2Cl_2 \rightarrow Cl^- \qquad (2)$$

These reactions produce the overall reaction of:

$$Li + 1/2Cl_2 \rightarrow LiCl \qquad (3)$$

In such Type I batteries, the electrolytes are typically an alkali metal halide such as lithium chloride, or lithium chloride-lithium fluoride mixture, etc. It will be noted that the electrolyte is preferably a halide salt, or a mixture thereof, of the anode metal. This is also true of the pseudo-electrochemical cells to be described below.

The second type of batteries involved herein, the pseudo-electrochemical cells (hereinafter referred to as Type II), are those having liquid metal cathodes. For example, such a battery may have an alkali metal anode, an alkali metal halide or mixtures of alkali metal halides as the electrolyte, and a cathode formed of relatively low melting point but high boiling point metallic elements or compounds, such as tin. Examples of suitable materials for the anode include lithium, sodium and potassium. Examples of the electrolytes which may be used in such a battery include lithium bromide-lithium fluoride-lithium iodide or lithium fluoride-lithium chloride-lithium iodide or other combinations of these salts. Examples of the cathode include tin, antimony, lead, phosphorus, tellurium, selenium, and mixtures or alloys thereof. The electrode and overall cell reactions for a typical example of such a battery are as follows:

Anode: $Li \rightarrow Li^+ + 3^-$ (4)
Cathode: $3^- + Li^+ + Sn \rightarrow LiSn$ (5)
Overall: $Li + Sn \rightarrow LiSn$ (6)

Strictly speaking, the Type II cell involves electrochemical reactions in an unusual sense. The anodic reactant, lithium or other alkali metal, and the cathodic reactant, tin or other low melting metal or compound do not react to form an electrochemical compound. Rather, a type of intermetallic compound is formed, and is represented in the above example as LiSn, although the actual intermetallic compound composition may be complex or in other than simple 1:1 relationship.

The high temperature battery systems described above possess the advantage that the electrodes or the "reactants" are maintained in a liquid or fluid condition at the operating temperature of the batteries. When the metallic electrodes are in a liquid condition, they are good conductors and highly reactive, which minimize "polarization" losses, and the cells are highly reversible. Moreover, they can be recharged either by simple electrical recharging in the usual manner by applying reverse voltage or current or they may be thermally "regenerated." The thermal regeneration involves a process in which the metal-metal compound formed in discharge of the battery, the LiSn in the above example, is separated into two metals, one liquid in form and the other vaporous, by a near isothermal distillation-like process at or above the boiling temperature of the anode material. In the case of lithium-tin cells, lithium can be removed from the lithium-tin intermetallic compound by distilling the small amount of lithium away from the excess tin. The vaporous lithium may then be condensed and returned to the anode chamber as a liquid at the ambient temperature of the cell while the liquid tin is returned to the base of the cathode chamber by convection or pumps. In the cathode chamber, the intermetallic compound is formed again by the operation of the battery on discharge, and passes again into a distillation chamber for the "regeneration."

Both of the above-described types of high temperature cells are known and have been operated experimentally under laboratory conditions. However, there are serious problems encountered in the practical utilization of such batteries, particularly if such batteries are to be stacked into multiple cell batteries. One of the major problems with these cells is that at the operational temperature, the electrodes, as well as the electrolytes, are at a fluid condition. As indicated above, the liquid condition of the components of the cell contributes to the very low polarization losses of such cells. However, these fluid components or phases in a cell must be kept separate since, for example, a liquid lithium anode may react explosively with the cathode material if direct contact between the two components is permitted to take place. In the laboratory, such fluid phases in the cell are maintained separate by the density differences between the phases. As an example, in the lithium-tin cell described above, the tine cathode is the densest phase and it forms the bottom layer in the cell, the intermediate density electrolyte forms the middle layer in the cell, while the lightest lithium anode phase floats on top of the electrolyte layer. However, since there is a net transfer of matter from the anode to the cathode, the phases must be free to move. Moreover, there must be good contact between the phases for the operation of the battery. During the course of the reaction, there is a decreasing volume of material at the anode and an increasing volume at the cathode. The mass transfer and the change in volume tends to disturb the interfaces. Of course, it is clear that the maintaining of separate fluid phases in such batteries by density gradients is not feasible if the battery is used in a moving vehicle or non-gravational field. Finally, it is not feasible to stack a plurality of such cells while maintaining three distinct liquid phases in each cell, to form a multiple-cell battery system.

It is, therefore, an object of the invention to provide an improved high temperature battery which contains an improved electrolyte capable of separating the fluid electrodes.

It is another object of the invention to provide an improved high temperature battery having fluid electrodes which may be used in a moving and non-gravitational vehicle.

It is a further object of the invention to provide an improved high temperature battery which has a stable electrolyte composition resistant to attacks by the corrosive components in such battery.

It is still another object of the invention to provide an improved high temperature battery which can be stacked to form a multicell battery system.

Still further objects of the invention can be gathered from the following description.

SUMMARY OF THE INVENTION

In accordance with the present invention, there is provided a high temperature battery having fluid electrodes, wherein the electrolyte phase is made of a solid or paste-like support matrix made from an inert alkali metal salt and having the electrolyte for said battery incorporated and immobilized therewithin. The support matrix for the electrolyte phase of the battery is prepared from a truly inert alkali metal salt so that it is resistant to corrosion or attack by the highly reactive components within the battery. The support matrix should also have a solid or a paste-like consistency and rheology at the operating temperature of the cell. Whether the support matrix is in a solid or paste-like state at the operating temperature of the cell depends primarily on the relative amount of electrolyte and the support matrix present in the electrolyte phase. The preferred inert alkali metal salt is an alkali metal aluminate made by reacting an alkali metal compound, such as an alkali metal carbonate, with γ-alumina at elevated temperatures.

DESCRIPTION OF THE PREFERRED EMBODIMENT

As indicated above, the high temperature batteries with fluid electrode materials described herein possess certain advantages in that they are highly reversible and can be operated with negligible polarization losses. On the other hand, there are difficulties in maintaining such fluid components of the batteries separate while maintaining good contact between the phases, particularly when the battery is to be used in a moving vehicle. Moreover, the stacking of such batteries to form a multicell battery has not been feasible.

In accordance with the present invention, an improved electrolyte phase is provided for said batteries which is capable of separating the fluid electrodes while at the same time permitting mass transfer between the electrodes to take place and maintaining good contacts with both electrodes. The electrolyte phase of the present invention is of a solid or paste-like consistency at the operating conditions of the battery. The physical characteristics of the electrolyte phase of the present invention permits it to act as a barrier separating the two fluid electrodes to prevent direct contact of the fluid materials which comprise the electrodes.

The novel electrolyte phase of the invention comprises a supporting matrix and the electrolyte for the battery. The supporting matrix is formed of an inert alkali metal compound which is resistant to attacks or reactions with the reactive materials normally present in the batteries in question. For example, the inert compound must be able to resist attack by liquid lithium and molten alkali metal halides at elevated temperatures. In addition, the inert compound must be of a solid or semi-solid consistency at the operating temperatures so that it can effectively serve as the barrier between the electrodes. Moreover, the inert compound for the supporting matrix must possess good loading characteristics for the electrolyte in question so that a sufficient amount of the electrolyte can be held or immobilized by the supporting matrix for the efficient functioning of the battery.

A number of refractory materials which are normally considered to be inert have been found to be unsatisfactory for use as a supporting matrix of the present invention. These unsatisfactory materials include magnesium oxide (magnesia) and commercial aluminum oxide (α-alumina). These normally inert refractory materials are attacked by the highly corrosive alkali metals and their halides used as the anode material and electrolytes in the high temperature batteries of the present invention.

Unexpectedly, it has been found that a truly stable and inert material can be produced and used for the supporting matrix of the electrolyte phase of the present invention by reacting a reactive transition alumina with an alkali metal salt. For example, a reactive transition alumina, such as gamma-alumina, may be reacted with an alkali metal salt, such as alkali metal carbonates, to form an alkali metal aluminate which is highly resistant to chemical attack from the molten salts and molten metals used in the high temperature batteries of the invention. In addition to the use of a reactive transition alumina, it has been found that increased loading capabilities for the electrolytes in question can be achieved by proper procedure in the manufacturing process for the electrolyte phase.

As indicated above, the inert alkali metal compound for use in making the supporting matrix herein is prepared by reacting an essentially pure alkali metal salt with a pure reactive transition alumina, such as γ-alumina. Ordinary alumina which is non-reactive or fused alumina, the mineral corundum, anhydrous alumina, α-alumina or alpha $Al_2O_3$, or the fused alumina sold under the trade name "Allundum," which is a synthetic or prepared corundum, is not suitable for preparing the inert aluminates of the present invention.

The inert alkali metal aluminate may be prepared by reacting an alkali metal salt, such as an alkali metal carbonate, with a reactive transition alumina such as γ-alumina, at elevated temperatures, up to about 600°–700° C., for a period of up to 24 hours.

The preferred inert alkali metal compound for use in making the support matrix of the present invention is one wherein the metal component corresponds to the alkali metal employed as the anode of the battery. The preferred material for making the inert alkali metal aluminate is a pure alkali metal carbonate. The resultant alkali metal aluminate product will be either the rhomobohedric (alpha) or tetragonal (gamma) phase, depending on the reaction temperature employed.

It has also been found that commercially available lithium aluminate, in contrast to the lithium aluminate prepared in accordance with the present invention, is not suitable for making the support matrix for the electrolyte phase of the present invention.

The invention will now be further illustrated by the following example, but the invention is not restricted to these examples. Unless otherwise specified, all percentages and parts are by weight.

EXAMPLE 1

A stoichiometric amount of pure lithium carbonate and dry and pure γ-alumina were thoroughly mixed and reacted at 700° C. until constant weight is achieved. The molar ratio of lithium carbonate to γ-alumina at the start was 1:1. After the constant weight status was reached, the excess lithium carbonate was removed. The lithium aluminate so formed was then ground to a size smaller than 100 mesh for use in making the electrolyte phase herein.

EXAMPLE 2

A powdered mixture of lithium bromdie-lithium iodide-lithium fluoride, as the electrolyte for a high temperature battery, was mixed with finely powdered lithium aluminate prepared according to Example 1 to form an overall mixture containing about 35 percent lithium halide and 65 percent lithium aluminate. This overall mixture was thoroughly mixed in a ball mill and then pressed in a steel die, first at ambient temperatures and a pressure of 8,000 p.s.i. and later at 400° C. and 8,000 p.s.i. Discs between 0.23 and 0.42 inch in thickness and 0.75 inch in diameter were prepared which were treated by heating to 500° C. The heating produced no change in shape of the discs, thus indicating that a stable structure in which the lithium aluminate completely contained the molten halide salt. The discs so produced which constitute the electrolyte phase of the present invention were then immersed in liquid lithium and found to be completely resistant to chemical attack thereby.

EXAMPLE 3

Example 2 was repeated except that the ratio of the lithium halide to lithium aluminate was changed to about 50 percent lithium halide and 50 percent lithium aluminate. Discs of about 100 mils thick and 0.75 inch in diameter were successfully prepared and again found to retain their shape at elevated temperatures above the melting point of the lithium halides.

EXAMPLE 4

Example 2 was again repeated with about 40 percent lithium aluminate and 60 percent lithium halides. Electrolyte phase was again prepared in accordance with Example 2 with the discs having about 0.75 inch diameter and between 90 to 130 mils in thickness. These discs were again found to have good mechanical structural properties.

EXAMPLE 5

The procedure of Example 2 was repeated except that 50 percent lithium aluminate was mixed with 50 percent of an alkali metal halide mixture. A pellet 0.238 cm thick and 2.86 square cm in area was prepared at a pressure of 8,000 p.s.i. and a temperature of 220° C. The disc was then used in a lithium-tin bimetallic cell operated at 400° C. The disc which represents the electrolyte phase served to effectively separate the two liquid phases of lithium and tin. The separated cell, which has an active area equal to that of the disc (2.86 sq. cm.), has a resistance of 0.63 ohm. Table I below shows the instantaneous voltage-current characteristics for discharge-charge conditions for this cell, while Table II shows the voltage-time characteristics of the cell.

TABLE I

Instantaneous Voltage-Current Characteristics of Battery of Example 5

| Voltage (volts) | Current Density (mA/cm$^2$) |
|---|---|
| Discharge | |
| 0.75 | 0 |
| 0.60 | 70 |
| 0.40 | 160 |
| 0.20 | 246 |
| Charge | |
| 0.8 | 20 |
| 0.9 | 62 |
| 1.0 | 110 |

TABLE II

Voltage-Time Characteristics of Battery of Example 5

| Time (minutes) | Voltage (volts) | |
| | 70 mA rate | 170 mA rate |
|---|---|---|
| 0 | 0.75 | 0.75 |
| 5 | 0.68 | 0.575 |
| 10 | 0.67 | 0.56 |
| 20 | 0.66 | 0.54 |
| 40 | 0.65 | 0.515 |
| 60 | 0.63 | 0.48 |

The above examples are for illustrative purposes only and that other forms of matrices could be prepared. For example, for high rate short life primary battery applications, very thin matrices might be prepared by flame spraying lithium aluminate on a suitable substrate and then immersing the lithium aluminate structure in the electrolyte to render it conductive. Moreover, the particular pressure and temperature employed in the making of the electrolyte phase pellets given above are only illustrative and other pressures and temperatures may be used therefor.

As noted above, an amount of the lithium aluminate is added to the electrolyte salt to comprise 40 to 65 percent by weight of the total. The electrolyte and aluminate mixture which is solid and in powdered form, is then compressed by standard techniques into a form for use as the electrolyte phase in a high temperature battery. In another embodiment of the invention, the powdered mixture of aluminate and the electrolyte may be used as such, without hot pressing in primary batteries, such as missile batteries, or as the electrolyte sandwich in secondary batteries, such as an automobile battery.

Since the electrolyte salts, i.e., the alkali metal halide mixtures, are the conductive portion of the electrolyte phase of the invention, it is clear that higher conductivities for the electrolyte phase are obtained with a lower percentage of the inert support material. In accordance with the present invention, as little as about 40 percent of the inert aluminate will form an excellent support for the electrolyte to yield high conductivities.

The invention has been described in detail with reference to particular and preferred embodiments thereof, but it will be understood that variations and modifications can be made within the spirit and scope of the invention as described hereinabove and as defined in the appended claims.

What is claimed is:

1. In a high temperature storage battery having an anode, cathode, and an electrolyte phase disposed between said anode and said cathode, the improvement wherein:
   said cathode is selected from tin, antimony, lead, phosphorous, sulfur, tellurium, selenium or mixtures or alloy mixtures thereof, and
   said electrolyte phase comprises an alkali metal salt electrolyte supported in paste condition at the operating conditions of said battery by a substantially pure and inert alkali metal aluminate matrix in an amount from about 30 to about 60 percent by weight of said electrolyte phase.

2. Battery of claim 1 wherein said inert alkali metal aluminate is prepared from the reaction of a reactive transition alumina with an alkali metal salt.

3. Battery of claim 2 wherein said inert alkali metal aluminate is lithium aluminate prepared from the reaction of lithium carbonate and γ-alumina.

4. Battery of claim 2 wherein said inert alkali metal aluminate is sodium aluminate prepared from the reaction of sodium carbonate and γ-alumina.

5. Battery of claim 2 wherein said inert alkali metal aluminate is potassium aluminate prepared from the reaction of potassium carbonate and γ-alumina.

6. In a high temperature storage battery having an anode, a cathode, and an electrolyte phase disposed between said anode and said cathode, the improvement wherein said anode is an alkali metal, said electrolyte phase comprises an alkali metal salt electrolyte supported by a substantially pure and inert alkali metal aluminate matrix in an amount from about 30 to about 60 percent by weight of said electrolyte phase, and said alkali metal aluminate contains the same alkali metal as said anode.

7. Battery of claim 6 wherein said anode is lithium and said inert alkali metal aluminate is lithium aluminate.

8. Battery of claim 6 wherein said anode is lithium, said cathode is tin, and said electrolyte phase is made of a matrix support formed of lithium aluminate and an electrolyte formed of a mixture of lithium halides.

9. Battery as in claim 6 wherein said cathode is selected from tin, antimony, lead, phosphorous, sulfur, tellurium, selenium or mixtures or alloy mixtures thereof.

* * * * *